United States Patent Office 3,431,105
Patented Mar. 4, 1969

3,431,105
PROCESS FOR MANUFACTURING PARTS PROVIDED WITH A SINTERED SURFACE LAYER
Friedrich Heck, Deilinghofen, Germany, assignor to Duria-Werk Karl Kempf G.m.b.H., Neuss (Rhine), Germany
Filed Feb. 12, 1968, Ser. No. 704,917
U.S. Cl. 75—208
Int. Cl. B22f 7/04
5 Claims

ABSTRACT OF THE DISCLOSURE

A process for manufacturing parts provided with a sintered surface layer containing depressions, comprises forming the sintered layer on the part and then forming the depressions in the layer by a technique which may be conventional and then, after the formation of the depressions, the layer is compressed using a flat press tool acting on the surface of the layer so that material in the layer is forced laterally into the depressions. The depressions may consist of a series of grooves formed side-by-side and the sintered layer is then formed and grooved by applying sintering powder in a layer to the surface of the part, partially sintering this layer of powder and then compressing the partially sintered layer using a ridged press tool so that grooves are pressed into the layer at the same time as the layer is compressed. After this the layer is further sintered and then subjected to the final operation of compression using the flat press tool.

---

This invention relates to processes for manufacturing parts provided with a sintered surface layer containing grooves, notches or like depressions, for example clutch plates provided with a sintered pad on one or both faces.

Various processes are already known for this purpose. In one of these sintering powder is first of all pressed to form a shaped sheet, and this is then sintered on to the supporting part. In another known process the powder is first of all sprinkled as evenly as possible on to the supporting part and is then compacted by pressing. After this compression, or after pressing the layer of powder on the supporting part, the powder is sintered providing a firm bond between the supporting part and the sintered layer.

By these methods a sintered pad with a substantially flat and continuous surface is produced and the necessary grooves, notches or the like are then cut by a machining operation. The sintered layer often retains a certain residual porosity, and this is exploited during the press operation in compensating for dimensional deviations in the supporting part or in the layer of sintered powder. However, it has been found in practice that this residual porosity in the sintered layer has certain disadvantages. The non-metal components of the sintered mass are embedded more firmly the lower the residual porosity. These non-metal constituents, for example graphite, are therefore torn out of the surface of the sintered layer more easily with increasing residual porosity. The effect in practice is that the layer wears more rapidly with increasing residual porosity.

The object of the present invention is to overcome the disadvantage arising in the known processes due to the residual porosity, and to provide a process allowing parts provided with a sintered layer containing grooves, notches or the like, particularly clutch plates, to be manufactured with a lower residual porosity.

To this end, according to this invention, in a process for manufacturing parts provided with a sintered surface layer containing grooves, after forming the sintered layer on the part and forming the depressions in the layer, the layer is compressed using a flat press tool acting on the surface of the layer so that material in the layer is forced laterally into the depressions.

Preferably when the layer is formed with a series of grooves side-by-side, the clear width on the surface of the layer between adjacent grooves before the layer is compressed is between two and three times the thickness of the sintered layer. The total surface area of the grooves is preferably between 20% and 35% of the total surface area between the grooves.

Particular advantages are obtained by pressing the grooves into a presintered powder layer rather than by cutting them by a machine operation. For this purpose the process according to the invention is performed as follows: Sintering powder is applied in a layer to the part, the layer of powder is sintered, the sintered layer is compressed to a thickness of up to 15% greater than the thickness of the finished layer using a ridged press tool so that grooves are formed in the layer by the pressing operation, the layer is then sintered again and is finally subjected to the compression using a flat press tool on the surface of the layer, the grooves being made narrower by the material from the layer which is forced laterally into them.

Before the final compression the residual porosity of the layer is preferably between 5% and 10%, and the depressions penetrate almost as far as the surface of the supporting part, leaving only a thin layer of sintered material at the bottom of each depression.

An example of a process in accordance with the invention will now be described with reference to the accompanying drawings in which.

Figure 1:
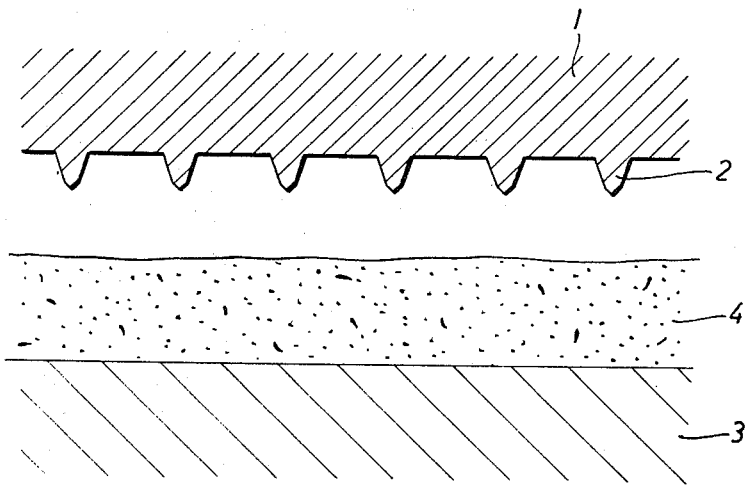
FIGURE 1 is a section through part of a clutch plate and part of a press tool before pressing.

FIGURE 1 shows diagrammatically a press tool 1 whose surface has projecting ridges 2 for pressing grooves, for example spiral grooves, into the surface of a sintered layer 4. Under the tool 1 there is the layer 4 consisting of powder which has been sprinkled on to the surface of a clutch plate 3 and has then been presintered on the plate to give a porous layer. When the tool 1 moves downwards, the ribs 2 penetrate into the presintered layer, which they at the same time compress and divide into individual surfaces 5. At the end of the compression stroke the tips of the ribs 2 are quite near the surface of the plate 3. The thickness of the layer up to the surfaces 5 is about 15% greater than the intended final thickness of the layer. After the completion of this pressing operation the ridges formed in the material of the layer, as shown in FIGURE 2, retain a residual porosity of between 10% and 15%.

Figure 2:
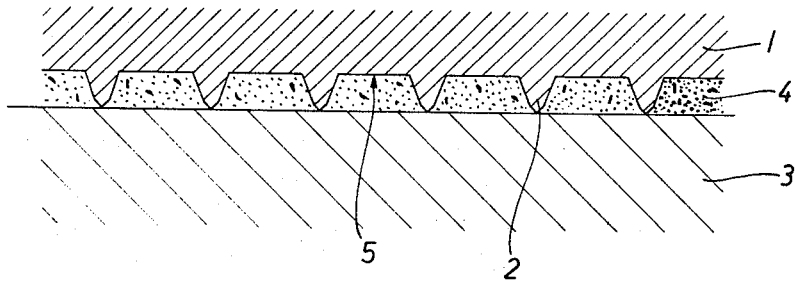
FIGURE 2 is a view similar to FIGURE 1, but during pressing.

The residual porosity which remains in the material of the layer after compression and after pressing in the grooves, as shown in FIGURE 2, is necessary during the final sintering to allow lead contained in the pores of the material to expand without oozing out through the surface. If the porosity were insufficient the lead would ooze out and would not be re-absorbed when the layer cools again.

Figure 3:
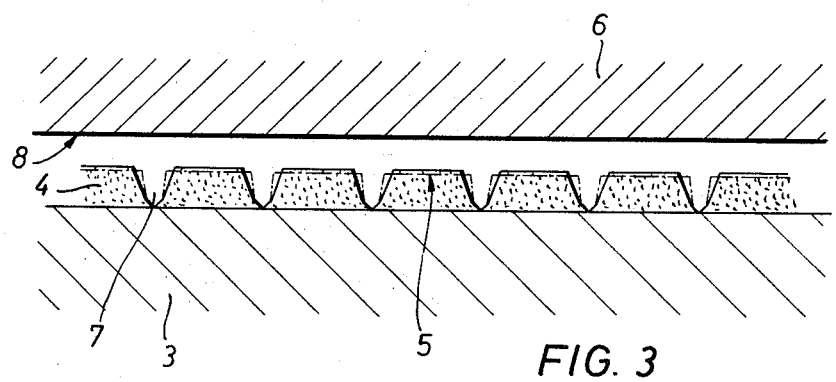
FIGURE 3 is a view similar to FIGURE 1 but showing a press tool for a final compression of the grooved sintered layer; and, FIGURE 4 is a plan of the finished clutch plate.

The final pressing operation is performed using a press tool 6 shown in FIGURE 3. This tool has a flat surface 8, and when the tool moves down it comes into contact with the individual friction surfaces 5 and compresses the finally sintered layer 4 to the required thickness. In the final pressing operation the individual surfaces 5 and the grooves 7 assume the outlines shown as broken lines in FIGURE 3. In this way the layer is compressed, and at the same time material is displaced laterally so as partly to fill the grooves 7. The final compression reduces the thickness of the layer by up to 15%.

Figure 4:
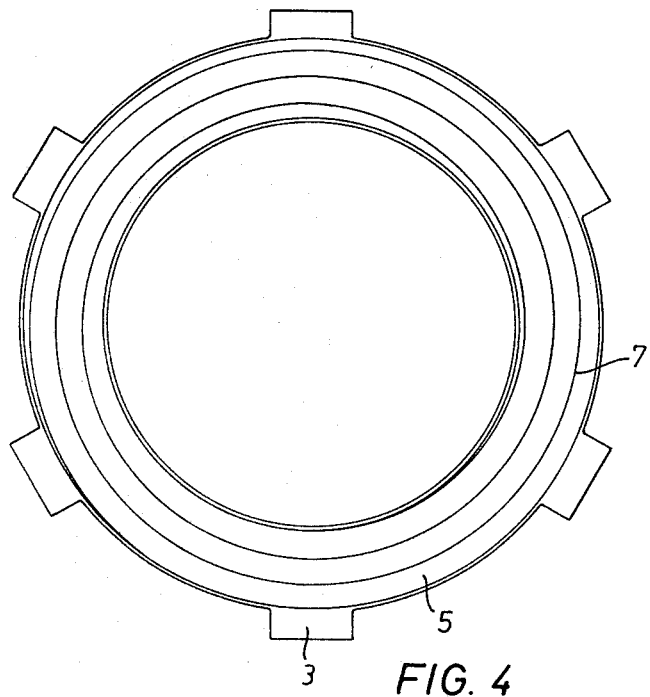

The process described by way of example results in a clutch plate shown in plan view in FIGURE 4. The plate has a spiral groove 7 which forms a series of grooves side-by-side and has a flank angle of between 30° and 90°. If the plate is used as a wet clutch the oil collects in the groove and so shortens the engagement operation. On the other hand, spiral grooves or other depressions in the friction surface are also useful in the case of dry operation, that is to say oil-free operation. In this case the grooves, in addition to removing oil from the friction surface, also accommodate the abrasion particles. The total grooved surface area should therefore be between 20% and 35% of the total area of the surfaces 5. A clutch plate of this kind has outstanding properties when operated in oil, particularly in clutches which give very short engagement times. They have a long working life and are capable of handling high loads. Heat is removed rapidly by the oil which enters the grooves. The plate can of course be provided with a sintered layer on both sides each containing a spiral groove or other depression.

The amount of material forced into the groove 7 during the final compression of the layer depends essentially on the ratio between the width of each friction surface 5 and the thickness of the layer. Tests have shown that this ratio should be between 2:1 and 3:1, before the final compression of the layer. The final compression can if desired be applied to a sintered pad, containing grooves or the like, which is applied to the support in some other way than that described above, and has been formed with grooves. However, the best results are obtained by the process which has been described by way of example.

I claim:
1. In a process for manufacturing parts provided with a sintered surface layer containing depressions, comprising forming said sintered layer on said part and forming said depressions in said layer, the improvement wherein, after the formation of said depressions, said layer is compressed using a flat press tool acting on the surface of said layer whereby material in said layer is forced laterally into said depressions.

2. A process as claimed in claim 1, wherein said depressions consist of a series of grooves formed side-by-side in said layer, the width of the surface of said layer between adjacent grooves being between two and three times the thickness of said sintered layer between said grooves.

3. A process as claimed in claim 1, wherein said depressions consist of a series of grooves formed in said layer, the total area of said grooves on the surface of said layer being between 20% and 35% of the total area of the surface of said layer between said grooves.

4. A process as claimed in claim 2, wherein said sintered layer is formed and grooved by the steps of applying sintering powder in a layer to the surface of said part, partially sintering said layer of powder, compressing said partially sintered layer to a thickness up to 15% greater than the finished thickness of said layer using a ridged press tool so that grooves are pressed in said layer at the same time as said layer is compressed and after this said layer is further sintered and is subjected to said step of compression using a flat press tool whereby said grooves are narrowed by the lateral displacement of material in said layer.

5. A process as claimed in claim 1, wherein, prior to said step of compressing said sintered layer using a flat press tool, said layer has a porosity of between 5% and 10% and said depressions penetrate through said layer substantially to the surface of the said part.

References Cited

UNITED STATES PATENTS

| | | | |
|---|---|---|---|
| 2,793,427 | 5/1957 | Marvin | 29—420.5 |
| 3,226,814 | 1/1966 | Leib | 29—420.5 |
| 3,316,625 | 5/1967 | Flint | 29—420.5 |
| 3,365,777 | 1/1968 | MacDonald | 29—420.5 XR |

BENJAMIN R. PADGETT, *Primary Examiner.*

A. J. STEINER, *Assistant Examiner.*

U.S. Cl. X.R.

29—182.3, 420.5